United States Patent
Aimono

(10) Patent No.: US 8,730,549 B2
(45) Date of Patent: May 20, 2014

(54) TWO-DIMENSIONAL OPTICAL DEFLECTOR INCLUDING PIEZOELECTRIC SENSOR ON MOVABLE FRAME

(75) Inventor: Takanori Aimono, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 62 days.

(21) Appl. No.: 13/484,653

(22) Filed: May 31, 2012

(65) Prior Publication Data

US 2012/0327495 A1 Dec. 27, 2012

(30) Foreign Application Priority Data

Jun. 22, 2011 (JP) ................................. 2011-138621

(51) Int. Cl.
*G02B 26/08* (2006.01)

(52) U.S. Cl.
USPC ....................................................... 359/224.1

(58) Field of Classification Search
CPC .......................... G02B 26/0833; G02B 26/0841
USPC ............ 359/199.1, 212.1–214.1, 223.1–226.1
See application file for complete search history.

(56) References Cited

U.S. PATENT DOCUMENTS 7,630,112 B2 * 12/2009 Mizumoto ................. 359/199.1
2011/0292479 A1 12/2011 Hiraoka et al.

FOREIGN PATENT DOCUMENTS

JP 2010-122480 A 6/2010

* cited by examiner

*Primary Examiner* — Euncha Cherry
(74) *Attorney, Agent, or Firm* — Kenealy Vaidya LLP

(57) ABSTRACT

In a two-dimensional optical deflector including a mirror, a movable frame supporting the mirror, a first piezoelectric actuator connected between the movable frame and the mirror and adapted to rock the mirror with respect to a first axis of the mirror, a support body supporting the movable frame, and a second piezoelectric actuator connected between the support body and the movable frame and adapted to rock the mirror through the movable frame with respect to a second axis of the mirror, at least one piezoelectric sensor is provided on the movable frame and adapted to sense rocking vibrations of the mirror caused by the first and second piezoelectric actuators.

8 Claims, 10 Drawing Sheets

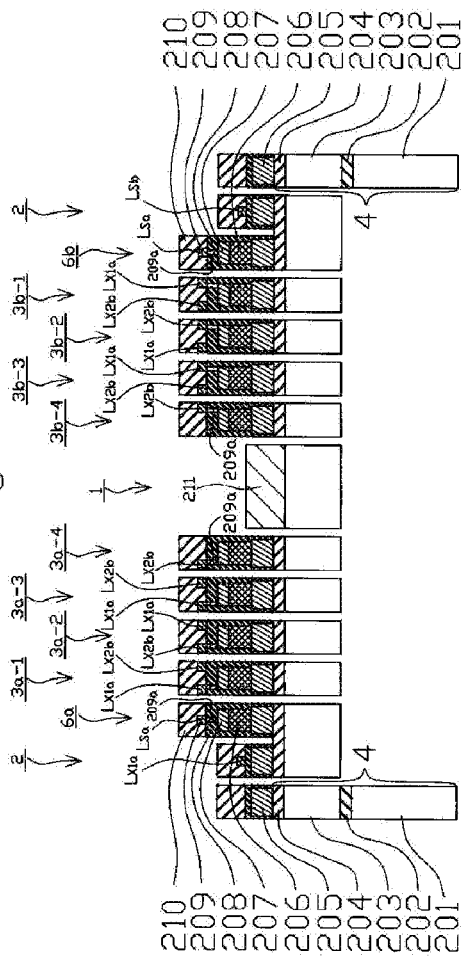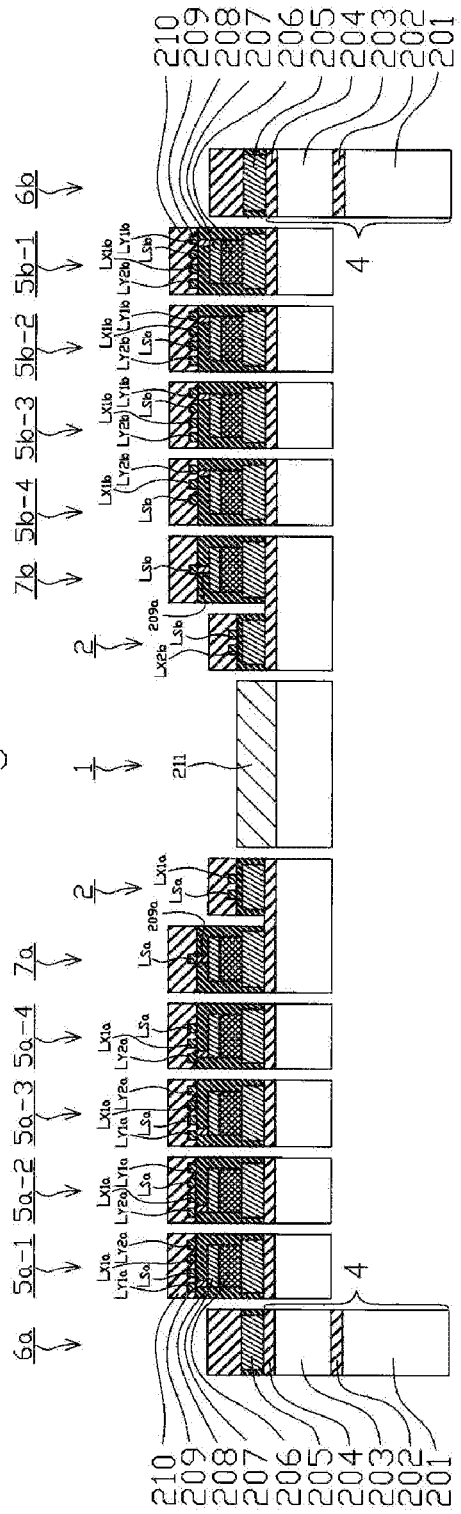

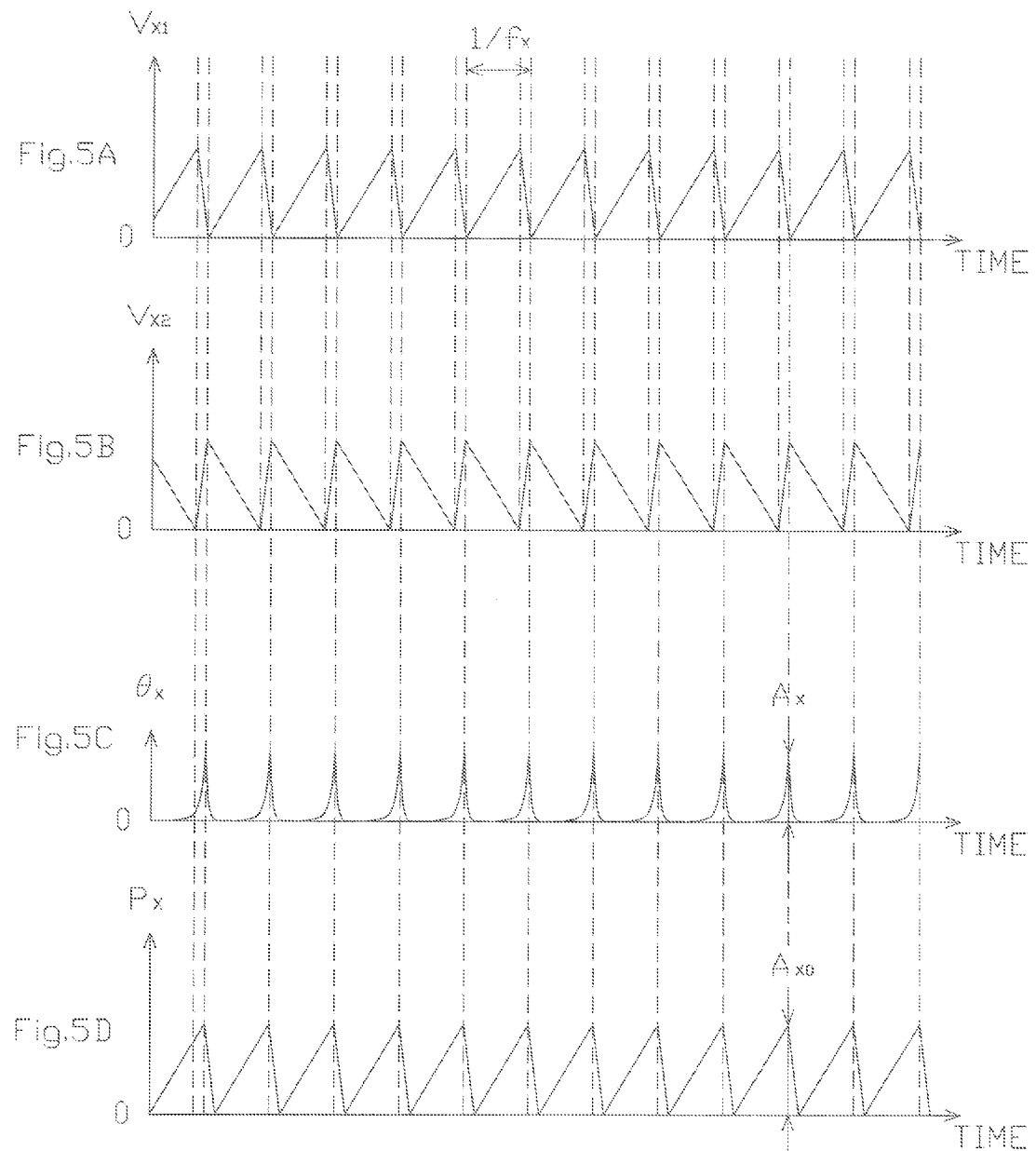

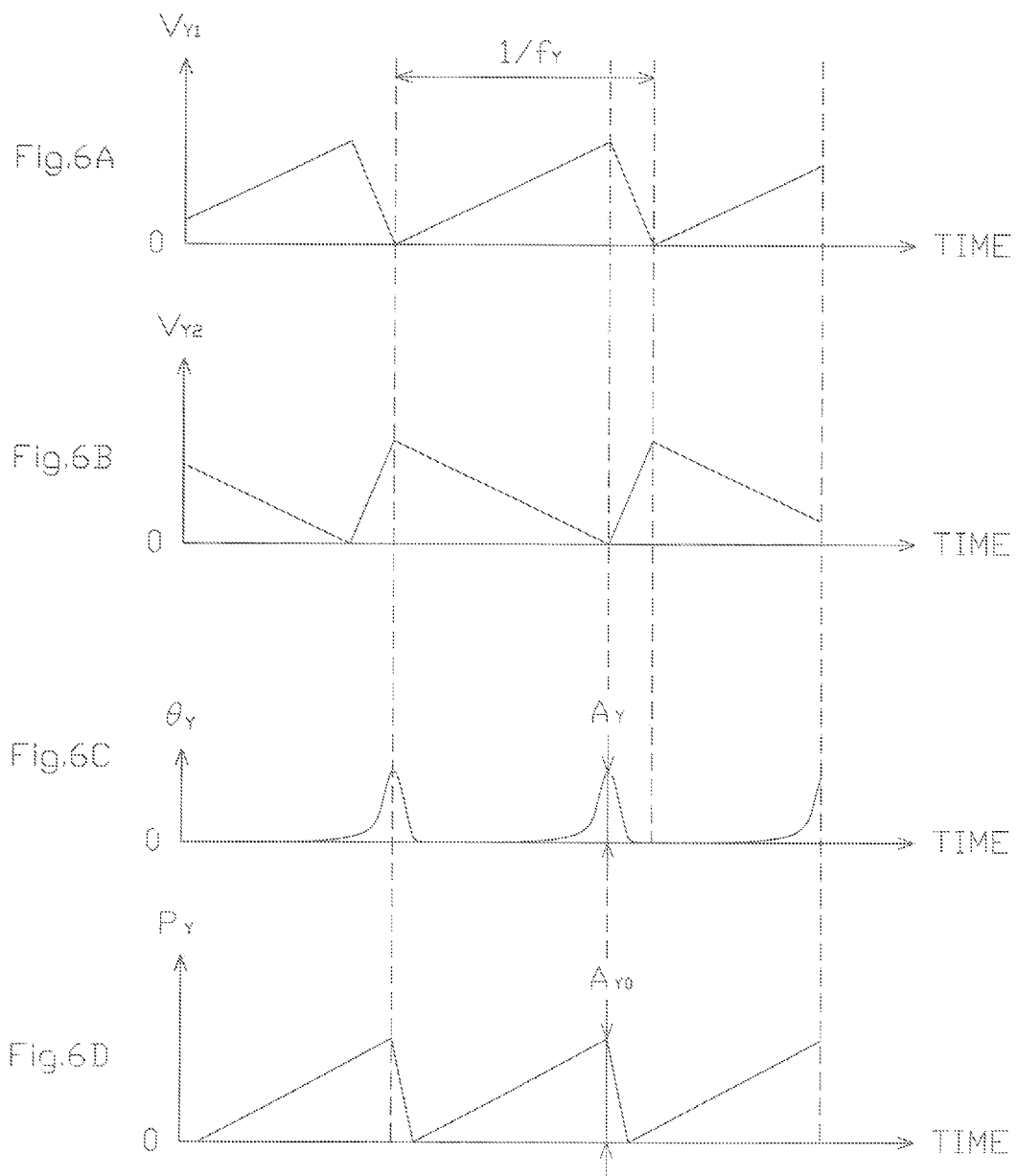

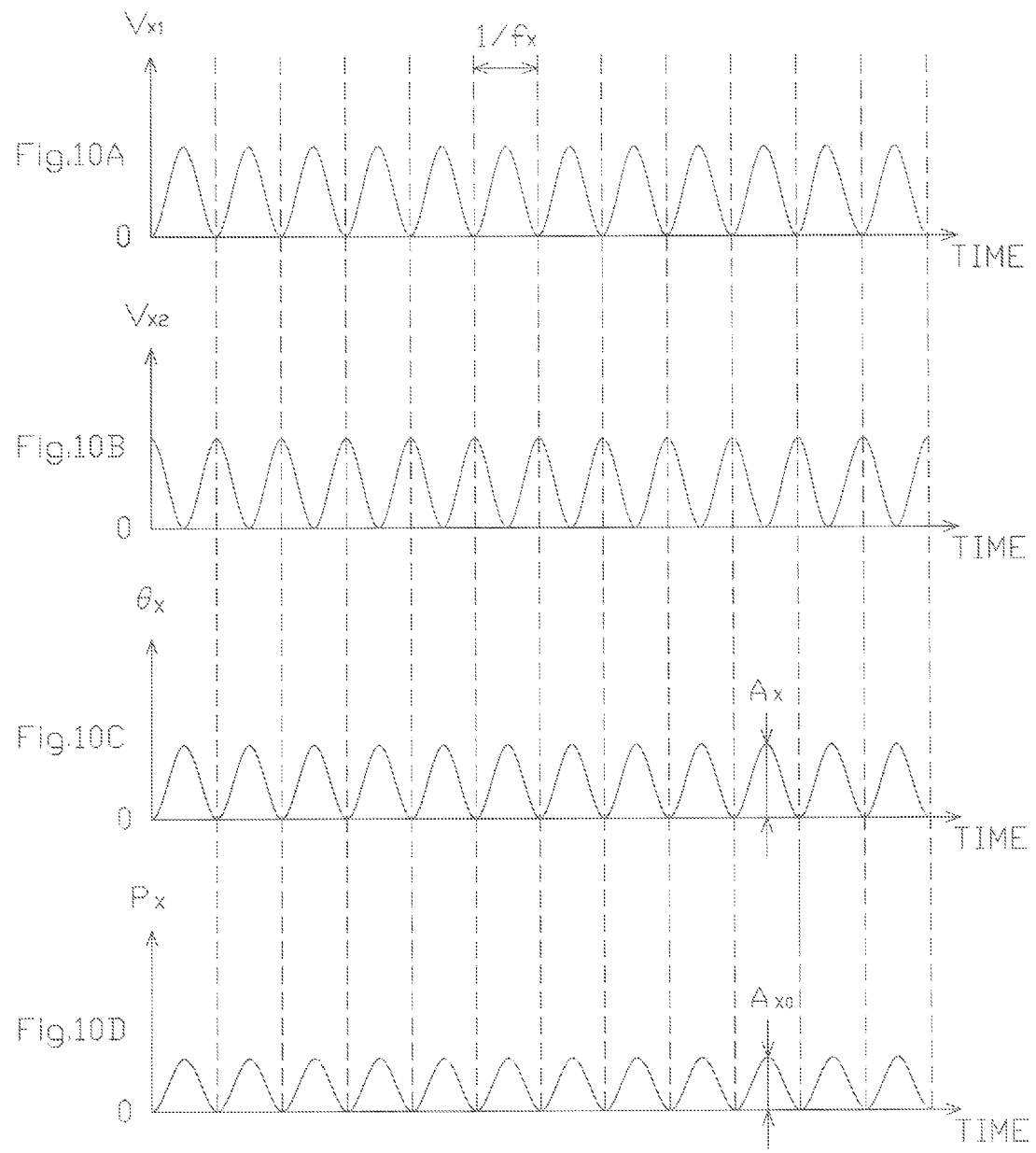

US 8,730,549 B2

TWO-DIMENSIONAL OPTICAL DEFLECTOR INCLUDING PIEZOELECTRIC SENSOR ON MOVABLE FRAME

This application claims the priority benefit under 35 U.S.C. §119 to Japanese Patent Application No. JP2011-138621 filed on Jun. 22, 2011, which disclosure is hereby incorporated in its entirety by reference.

BACKGROUND

1. Field

The presently disclosed subject matter relates to a two-dimensional optical deflector including sense elements (piezoelectric sensors).

2. Description of the Related Art

A prior art two-dimensional optical deflector is constructed by a mirror, a movable frame surrounding the mirror for supporting the mirror, a pair of meander-type inner piezoelectric actuators fixed between the movable frame and the mirror and serving as cantilevers for rocking the mirror with respect to an X-axis of the mirror, a support body surrounding the movable frame, and a pair of meander-type outer piezoelectric actuators fixed between the support body and the movable frame and serving as cantilevers for rocking the mirror through the movable frame with respect to a Y-axis of the mirror perpendicular to the X-axis (see: U.S. Patent Application Publication No. 2011/0292479A1 & JP2010-122480A).

Generally, in an optical scanner, the mirror is rocked with respect to the X-axis for a horizontal deflection at a high frequency, while the mirror is rocked with respect to the Y-axis for a vertical deflection at a low frequency.

In the described prior art two-dimensional optical deflector, each of the piezoelectric actuators includes a drive element and a monitor (sense) element separated from each other by a separation groove. Therefore, when the piezoelectric actuators are driven by their drive elements, the flexing amounts of the piezoelectric actuators are sensed by their sense elements. As a result, the actual flexing amounts of the piezoelectric actuators are controlled by the feedback of the output signals of the sense elements in such a way that the amplitudes of the output signals of the sense elements are brought close to predetermined values. Thus, the deflection of the optical deflector can be controlled with high accuracy.

In the above-described prior art two-dimensional optical deflector, however, since the sense elements are provided in the piezoelectric actuators, the provision of the drive elements in the piezoelectric actuators is decreased so that the rocking forces of the piezoelectric actuators are weakened, thus decreasing the deflection angles of the optical deflector.

SUMMARY

The presently disclosed subject matter seeks to solve the above-described problem.

According to the presently disclosed subject matter, in a two-dimensional optical deflector including a mirror, a movable frame supporting the mirror, a first piezoelectric actuator connected between the movable frame and the mirror and adapted to rock the mirror with respect to a first axis of the mirror, a support body supporting the movable frame, and a second piezoelectric actuator connected between the support body and the movable frame and adapted to rock the mirror through the movable frame with respect to a second axis of the mirror, at least one piezoelectric sensor is provided on the movable frame and adapted to sense rocking vibrations of the mirror caused by the first and second piezoelectric actuators.

Since the piezoelectric actuator includes no sense elements, the rocking force of the piezoelectric actuator is strengthened.

Also, the piezoelectric sensor is provided in the vicinity of one of the first and second piezoelectric actuators. Thus, the piezoelectric sensor easily senses the rocking vibration of the mirror caused by the one of the first and second piezoelectric actuators.

BRIEF DESCRIPTION OF THE DRAWINGS

The above and other advantages and features of the presently disclosed subject matter will be more apparent from the following description of certain embodiments, taken in conjunction with the accompanying drawings, wherein:

FIG. 2 is a cross-sectional view taken along the line II-II in FIG. 1;

FIG. 3 is a cross-sectional view taken along the line III-III in FIG. 1;

FIGS. 5A, 5B, 5C and 5D are timing diagrams for explaining examples of the drive voltages $V_{X1}$, $V_{X2}$, the deflection angle signal $\theta_X$ and an actual deflection angle signal $P_X$, respectively, of FIG. 1;

FIGS. 6A, 6B, 6C and 6D are timing diagrams for explaining examples of the drive voltages $V_{Y1}$, $V_{Y2}$, the deflection angle signal $\theta_Y$ and an actual deflection angle signal $P_Y$, respectively, of FIG. 1;

FIGS. 10A, 10B, 10C and 10D are timing diagrams for explaining examples of the drive voltages $V_{X1}$, $V_{X2}$, the deflection angle signal $\theta_X$ and an actual deflection angle signal $P_X$, respectively, of FIG. 9.

DETAILED DESCRIPTION OF EXEMPLARY EMBODIMENTS

Figure 1:
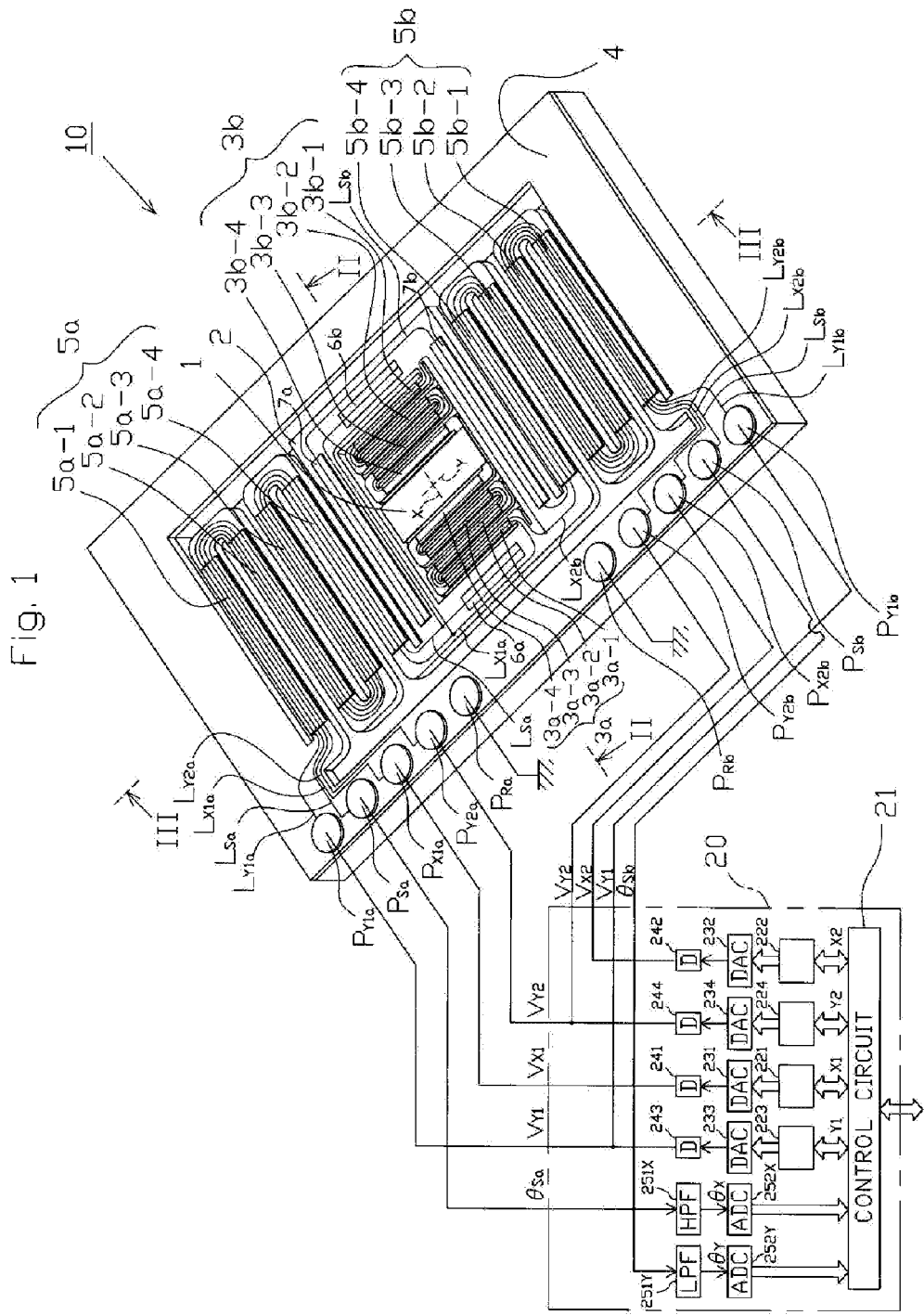
FIG. 1 is a view illustrating a first embodiment of the two-dimensional optical deflector according to the presently disclosed subject matter.

In FIG. 1, which illustrates a first embodiment of the two-dimensional optical deflector according to the presently disclosed subject matter, reference numeral 10 designates a two-dimensional optical deflector, and 20 designates a driver for driving the two-dimensional optical deflector 10.

The optical deflector 10 is constructed by a rectangular mirror 1 for reflecting an incident light, a movable frame 2 surrounding the mirror 1 for supporting the mirror 1, a pair of meander-type inner piezoelectric actuators 3a and 3b fixed between the movable frame 2 and the mirror 1 and serving as cantilevers for rocking the mirror 1 with respect to an X-axis of the mirror 1, a support body 4 surrounding the movable frame 2, a pair of meander-type outer piezoelectric actuators 5a and 5b fixed between the support body 4 and the movable frame 2 and serving as cantilevers for rocking the mirror 1 through the movable frame 2 with respect to a Y-axis of the mirror 1 perpendicular to the X-axis, piezoelectric sensors 6a and 6b on the movable frame 2 in the proximity of the inner piezoelectric actuators 3a and 3b, respectively, and piezoelectric sensors 7a and 7b on the movable frame 2 in the proximity of the outer piezoelectric actuators 5a and 5b, respectively.

Note that the Y-axis of the mirror 1 is accurately perpendicular to the X-axis of the mirror 1; however, the Y-axis does not need to be perpendicular to the X-axis.

The movable frame 2 is rectangularly-framed to surround the mirror 1 associated with the inner piezoelectric actuators 3a and 3b.

The inner piezoelectric actuators 3a and 3b oppose each other with respect to the mirror 1. The inner piezoelectric actuators 3a and 3b have ends coupled to the inner circumference of the movable frame 2 and other ends coupled to the mirror 1, in order to rock the mirror 1 with respect to the X-axis.

The inner piezoelectric actuator 3a is constructed by piezoelectric cantilevers 3a-1, 3a-2, 3a-3 and 3a-4 which are serially-coupled from the movable frame 2 to the mirror 1. Also, each of the piezoelectric cantilevers 3a-1, 3a-2, 3a-3 and 3a-4 are in parallel with the Y-axis of the mirror 1. Therefore, the piezoelectric cantilevers 3a-1, 3a-2, 3a-3 and 3a-4 are folded at every cantilever or meandering from the movable frame 2 to the mirror 1, so that the amplitudes of the piezoelectric cantilevers 3a-1, 3a-2, 3a-3 and 3a-4 can be changed along directions perpendicular to the X-axis of the mirror 1.

Similarly, the inner piezoelectric actuator 3b is constructed by piezoelectric cantilevers 3b-1, 3b-2, 3b-3 and 3b-4 which are serially-coupled from the movable frame 2 to the mirror 1. Also, each of the piezoelectric cantilevers 3b-1, 3b-2, 3b-3 and 3b-4 are in parallel with the Y-axis of the mirror 1. Therefore, the piezoelectric cantilevers 3b-1, 3b-2, 3b-3 and 3b-4 are folded at every cantilever or meandering from the movable frame 2 to the mirror 1, so that the amplitudes of the piezoelectric cantilevers 3b-1, 3b-2, 3b-3 and 3b-4 can be changed along directions perpendicular to the X-axis of the mirror 1.

Note that the number of piezoelectric cantilevers in the inner piezoelectric actuator 3a and the number of piezoelectric cantilevers in the inner piezoelectric actuator 3b can be other values such as 2, 6, 8, . . . .

The support body 4 is rectangularly-framed to surround the movable frame 2.

The outer piezoelectric actuators 5a and 5b are coupled between the inner circumference of the support body 4 and the outer circumference of the movable frame 2, in order to rock the movable frame 2 associated with the mirror 1 with respect to the support body 4, i. e., to rock the mirror 1 with respect to the Y-axis.

The outer piezoelectric actuator 5a is constructed by piezoelectric cantilevers 5a-1, 5a-2, 5a-3 and 5a-4 which are serially-coupled from the movable frame 2 to the support body 4. Also, each of the piezoelectric cantilevers 5a-1, 5a-2, 5a-3 and 5a-4 are in parallel with the X-axis of the mirror 1. Therefore, the piezoelectric cantilevers 5a-1, 5a-2, 5a-3 and 5a-4 are folded at every cantilever or meandering from the support body 4 to the movable frame 2, so that the amplitudes of the piezoelectric cantilevers 5a-1, 5a-2, 5a-3 and 5a-4 can be changed along directions perpendicular to the Y-axis of the mirror 1.

Similarly, the outer piezoelectric actuator 5b is constructed by piezoelectric cantilevers 5b-1, 5b-2, 5b-3 and 5b-4 which are serially-coupled from the movable frame 2 to the support body 4. Also, each of the piezoelectric cantilevers 5b-1, 5b-2, 5b-3 and 5b-4 are in parallel with the X-axis of the mirror 1. Therefore, the piezoelectric cantilevers 5b-1, 5b-2, 5b-3 and 5b-4 are folded at every cantilever or meandering from the support body 5 to the movable frame 2, so that the amplitudes of the piezoelectric cantilevers 5b-1, 5b-2, 5b-3 and 5b-4 can be changed along directions perpendicular to the Y-axis of the mirror 1.

Note that the number of piezoelectric cantilevers in the outer piezoelectric actuator 5a and the number of piezoelectric cantilevers in the outer piezoelectric actuator 5b can be other values such as 2, 6, 8, . . . .

The piezoelectric sensors 6a and 6b sense deflection angle signal $\theta_{Sa}$ of the mirror 1 mainly caused by the inner piezoelectric actuators 3a and 3b. Note that the output signals of the piezoelectric sensors 6a and 6b are substantially the same as each other, and therefore, these output signals are combined and represented by the deflection angle signal $\theta_{Sa}$.

The piezoelectric sensors 7a and 7b sense deflection angle signal $\theta_{Sb}$ of the mirror 1 mainly caused by the outer piezoelectric actuators 5a and 5b. Note that the output signals of the piezoelectric sensors 7a and 7b are substantially the same as each other, and therefore, these output signals are combined and represented by the deflection angle signal $\theta_{Sb}$.

Provided on the support body 4 are pads $P_{Ra}$, $P_{Y2a}$, $P_{X1a}$, $P_{Sa}$ and $P_{Y1a}$, $P_{Rb}$, $P_{Y2b}$, $P_{X2b}$, $P_{Y1b}$ and $P_{Sb}$. The pads $P_{Y2a}$, $P_{X1a}$, $P_{Y1a}$, $P_{Sa}$, $P_{Y2b}$, $P_{X2b}$, $P_{Sb}$ and $P_{Y1b}$ are connected to the driver 20.

The pad $P_{Ra}$ for receiving a reference voltage $V_R$ is connected via via-structures (not shown) to the lower electrode layers 205 (see: FIG. 2) of the piezoelectric cantilevers 3a-1, 3a-2, 3a-3 and 3a-4 of the inner piezoelectric actuator 3a, the lower electrode layers 205 (see: FIG. 3) of the piezoelectric cantilevers 5a-1, 5a-2, 5a-3 and 5a-4 of the outer piezoelectric actuator 5a, and the lower electrode layers 205 (see: FIG. 3) of the piezoelectric sensors 6a and 7a. In this case, the pad $P_{Ra}$ is grounded, i.e., the reference voltage $V_R$ is 0V.

The pad $P_{Y2a}$ is connected via a wiring line $L_{Y2a}$ to the upper electrode layers 207 (see: FIG. 3) of the even-numbered piezoelectric cantilevers 5a-2 and 5a-4 of the outer piezoelectric actuator 5a.

The pad $P_{X1a}$ is connected via a wiring line $L_{X1a}$ to the upper electrode layers 207 (see: FIG. 2) of the odd-numbered piezoelectric cantilevers 3a-1 and 3a-3 of the inner piezoelectric actuator 3a and the upper electrode layers 207 (see: FIG. 2) of the odd-numbered piezoelectric cantilevers 3a-1 and 3a-3 of the inner piezoelectric actuator 3b.

The pad $P_{Sa}$ is connected via a wiring line $L_{Sa}$ to the upper electrode layer 207 (see: FIG. 3) of the piezoelectric sensors 6a and 6b.

The pad $P_{Y1a}$ is connected via a wiring line $L_{Y1a}$ to the upper electrode layers 207 (see: FIG. 3) of the odd-numbered piezoelectric cantilevers 5a-1 and 5a-3 of the outer piezoelectric actuator 5a.

The pad $P_{Rb}$ for receiving the reference voltage is connected via via-structures (not shown) to the lower electrode layers 205 (see: FIG. 2) of the piezoelectric cantilevers 3b-1, 3b-2, 3b-3 and 3b-4 of the inner piezoelectric actuator 3b, the lower electrode layers 205 (see: FIG. 3) of the piezoelectric cantilevers 5b-1, 5b-2, 5b-3 and 5b-4 of the outer piezoelectric actuator 5b, and the lower electrode layers 205 (see: FIG. 3) of the piezoelectric sensors 6b and 7b. In this case, since the reference voltage $V_R$ is 0V, the pad $P_{Rb}$ is grounded.

The pad $P_{Y2b}$ is connected via a wiring line $L_{Y2b}$ to the upper electrode layers 207 (see: FIG. 3) of the even-numbered piezoelectric cantilevers 5b-2 and 5b-4 of the outer piezoelectric actuator 5b.

The pad $P_{X1b}$ is connected via a wiring line $L_{X1b}$ to the upper electrode layers 207 (see: FIG. 2) of the even-numbered piezoelectric cantilevers 3a-2 and 3a-4 of the inner piezoelectric actuator 3a and the upper electrode layers 207 (see: FIG. 3) of the even-numbered piezoelectric cantilevers 3b-2 and 3b-4 of the inner piezoelectric actuator 3b.

The pad $P_{Sb}$ is connected via a wiring line $L_{Sb}$ to the upper electrode layer 207 (see: FIG. 3) of the piezoelectric sensors 7a and 7b.

The pad $P_{Y1b}$ is connected via a wiring line $L_{Y1b}$ to the upper electrode layers 207 (see: FIG. 3) of the odd-numbered piezoelectric cantilevers 5a-1 and 5a-3 of the outer piezoelectric actuator 5b.

The driver 20 is constructed by a control circuit 21 such as a microcomputer including a central processing unit (CPU), a read-only memory (ROM) or a nonvolatile memory, a random access memory (RAM), an input/output (I/O) interface and the like.

The driver 20 includes a nonvolatile memory 221 for storing drive data X1 for driving the upper electrode layers of the odd-numbered piezoelectric cantilevers 3a-1 and 3a-3; 3b-1 and 3b-3, a digital-to-analog converter (DAC) 231 for converting the drive data X1 into a drive voltage $V_{X1}$, and a drive circuit 241 for applying the drive voltage $V_{X1}$ to the pad $P_{X1a}$.

The driver 20 further includes a nonvolatile memory 222 for storing drive data X2 for driving the upper electrode layers of the even-numbered piezoelectric cantilevers 3a-2 and 3a-4; 3b-2 and 3b-4, a digital-to-analog converter (DAC) 232 for converting the drive data X2 into a drive voltage $V_{X2}$, and a drive circuit 242 for applying the drive voltage $V_{X2}$ to the pad $P_{X2b}$.

The driver 20 further includes a nonvolatile memory 223 for storing drive data Y1 for driving the upper electrode layers of the odd-numbered piezoelectric cantilevers 5a-1 and 5a-3; 5b-1 and 5b-3, a digital-to-analog converter (DAC) 233 for converting the drive data Y1 into a drive voltage $V_{Y1}$, and a drive circuit 243 for applying the drive voltage $V_{Y1}$ to the pads $P_{Y1a}$ and $P_{Y1b}$.

The driver 20 further includes a nonvolatile memory 224 for storing drive data Y2 for driving the upper electrode layers of the even-numbered piezoelectric cantilevers 5a-2 and 5a-4; 5b-2 and 5b-4, a digital-to-analog converter (DAC) 234 for converting the drive data Y2 into a drive voltage $V_{Y2}$, and a drive circuit 244 for applying the drive voltage $V_{Y2}$ to the pads $P_{Y2a}$ and $P_{Y2b}$.

The driver 20 further includes a high pass filter (HPF) (or a band pass filter (BPF)) 251X for passing a frequency component $f_X$ such as 30 kHz of the analog deflection angle signal $\theta_{Sa}$ from the pads $P_{Sa}$ to generate an analog deflection angle $\theta_X$ excluding the frequency component $f_Y$ such as 60 Hz, a low pass filter (LPF) (or a band pass filter (BPF)) 251Y for passing a frequency component $f_Y$ such as 60 Hz of the analog deflection angle signal $\theta_{Sb}$ to generate an analog deflection angle signal $\theta_Y$ excluding the frequency component $f_X$ such as 30 kHz, and analog-to-digital converters (ADCs) 252X and 252Y for converting the analog deflection angle signals $\theta_X$ and $\theta_Y$ into digital deflection angle data.

As stated above, the piezoelectric sensors 6a and 6b are provided in the proximity of the inner piezoelectric actuators 3a and 3b, respectively, so that the piezoelectric sensors 6a and 6b could be easily flexed by the inner piezoelectric actuators 3a and 3b. Therefore, the analog deflection angle signal $\theta_{Sa}$ mainly includes the frequency component $f_X$ such as 30 kHz caused by the inner piezoelectric actuators 3a and 3b; however, even in this case, small amounts of the frequency component $f_Y$ such as 60 Hz caused by the outer piezoelectric actuators 5a and 5b would propagate via the movable frame 2 to the piezoelectric sensors 6a and 6b, so that the piezoelectric sensors 6a and 6b would also be flexed by the outer piezoelectric actuators 5a and 5b.

Also, the piezoelectric sensors 7a and 7b are provided in the proximity of the outer piezoelectric actuators 5a and 5b, respectively, so that the piezoelectric sensors 7a and 7b would be easily flexed by the outer piezoelectric actuators 5a and 5b. Therefore, the analog deflection angle signal $\theta_{Sb}$ mainly includes the frequency component $f_Y$ such as 60 Hz caused by the outer piezoelectric actuators 5a and 5b; however, even in this case, small amounts of the frequency component $f_X$ such as 30 kHz caused by the inner piezoelectric actuators 3a and 3b would propagate via the movable frame 2 to the piezoelectric sensors 7a and 7b, so that the piezoelectric sensors 7a and 7b would be also flexed by the inner piezoelectric actuators 3a and 3b.

Therefore, each of the analog deflection angle signals $\theta_{Sa}$ and $\theta_{Sb}$ can be represented by $$\theta_{Sa} \propto \theta_X + \theta_Y$$

$$\theta_{Sb} \propto \theta_X + \theta_Y$$

In this case, the high pass filter 251X can generate the analog deflection angle signal $\theta_X$ whose amplitude is relatively large and the low pass filter 251Y can generate the analog deflection angle signal $\theta_Y$ whose amplitude is relatively large.

The structure of each element of the optical deflector 10 is explained next with reference to FIGS. 2 and 3 which are cross-sectional views taken along the II-II line and the III-III line, respectively, in FIG. 1.

In FIGS. 2 and 3, a monocrystalline silicon support layer 201, an intermediate silicon dioxide layer 202 and a monocrystalline silicon active layer 203 are formed by a silicon-on-insulator (SOI) substrate. Also, reference numeral 204 designates a silicon dioxide layer, 205 designates a lower electrode layer of a double layer made of Ti, $TiO_2$ or $TiO_x$ ($0<x<2$) and Pt, $LaNiO_3$ or $SrRuO_3$, 206 designates a lead titanate zirconate (PZT) layer, 207 designates an upper electrode layer made of Pt, Au or the like, 208 designates an insulating interlayer made of silicon oxide or the like, 209 designates a wiring layer made of Pt, Au, Al or aluminum alloy, 209a designates a via-structure within the insulating layer 208 for electrically connecting the wiring layer 209 to the upper electrode layer 207, 210 designates a passivation layer made of silicon dioxide and/or silicon nitride, and 211 designates an about 100 to 500 nm metal layer made of Al, Ag, Au, Pt or the like.

The mirror 1 is constructed by the monocrystalline silicon active layer 203 serving as a vibration plate and the metal layer 211 serving as a reflector.

The movable frame 2 is constructed by the monocrystalline silicon active layer 203 and the silicon dioxide layer 204.

Each of the piezoelectric cantilevers 3a-1 to 3a-4 and 3b-1 to 3b-4 and the piezoelectric cantilevers 5a-1 to 5a-4 and 5b-1 to 5b-4 and the piezoelectric sensors 6a, 6b, 7a and 7b is constructed by the monocrystalline silicon active layer 203, the silicon dioxide layer 204, the lower electrode layer 205, the PZT layer 206 and the upper electrode layer 207.

The support body 4 is constructed by the monocrystalline silicon layer 201, the intermediate silicon layer 202, the monocrystalline silicon active layer 203 and the silicon dioxide layer 204.

The pads $P_{Ra}$, $P_{Y2a}$, $P_{X1a}$, $P_{Sa}$, $P_{Y1a}$, $P_{Rb}$, $P_{Y2b}$, $P_{X2b}$, $P_{Sb}$ and $P_{Y1b}$ and the wiring lines $L_{Y2a}$, $L_{X1a}$, $L_{Sa}$, $L_{Y1a}$, $L_{Y2b}$, $L_{X2b}$, $L_{Sb}$ and $L_{Y1b}$ are constructed by the wiring layer 209.

The meander-type piezoelectric actuators 3a, 3b, 5a and 5b are described below.

In the inner piezoelectric actuators 3a and 3b, the piezoelectric cantilevers 3a-1, 3a-2, 3a-3, 3a-4, 3b-1, 3b-2, 3b-3 and 3b-4 are divided into an odd-numbered group of the piezoelectric cantilevers 3a-1 and 3a-3; 3b-1 and 3b-3, and an even-numbered group of the piezoelectric cantilevers 3a-2 and 3a-4; 3b-2 and 3b-4 alternating with the odd-numbered group of the inner piezoelectric cantilevers 3a-1 and 3a-3; 3b-1 and 3b-3.

Similarly, in the outer piezoelectric actuators 5a and 5b, the piezoelectric cantilevers 5a-1, 5a-2, 5a-3, 5a-4, 5b-1, 5b-2, 5b-3 and 5b-4 are divided into an odd-numbered group of the piezoelectric cantilevers 5a-1 and 5a-3; 5b-1 and 5b-3, and an even-numbered group of the piezoelectric cantilevers 5a-2 and 5a-4; 5b-2 and 5b-4 alternating with the odd-numbered group of the outer piezoelectric cantilevers 5a-1 and 5a-3; 5b-1 and 5b-3.

Figure 4A:
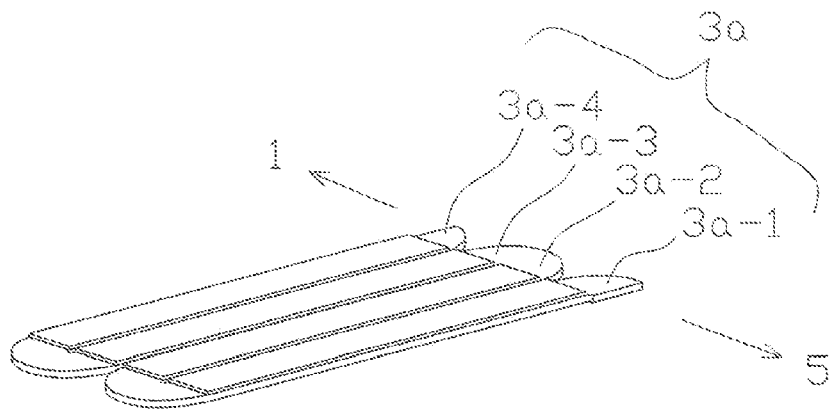
FIGS. 4A and 4B are perspective views for explaining a non-operation state and an operation state, respectively, of the piezoelectric cantilevers of one piezoelectric actuator of FIG. 1.
Figure 4B:
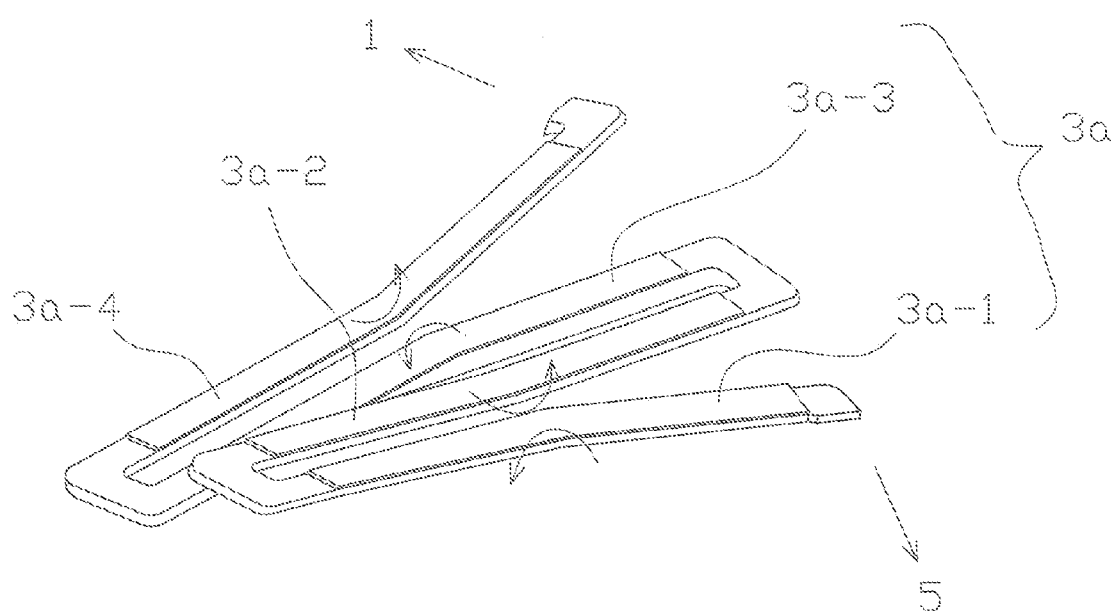

FIGS. 4A and 4B are perspective views for explaining the operation of the piezoelectric cantilevers of one piezoelectric actuator such as 3a of FIG. 1. Note that FIG. 4A illustrates a non-operation state of the piezoelectric cantilevers 3a-1, 3a-2, 3a-3 and 3a-4 of the piezoelectric actuator 3a, and FIG. 4B illustrates an operation state of the piezoelectric cantilevers 3a-1, 3a-2, 3a-3 and 3a-4 of the piezoelectric actuator 3a.

For example, as illustrated in FIG. 4B which illustrates only the piezoelectric cantilevers 3a-1, 3a-2, 3a-3 and 3a-4, when the odd-numbered group of the piezoelectric cantilevers 3a-1, 3a-3, 3b-1 and 3b-3 are flexed in one direction, for example, in a downward direction, the even-numbered group of the piezoelectric cantilevers 3a-2, 3a-4, 3b-2 and 3b-4 are flexed in the other direction, i.e., in an upward direction. On the other hand, when the odd-numbered group of the piezoelectric cantilevers 3a-1, 3a-3, 3b-1 and 3b-3 are flexed in the upward direction, the even-numbered group of the piezoelectric cantilevers 3a-2, 3a-4, 3b-2 and 3b-4 are flexed in the downward direction.

The operation of the piezoelectric cantilevers 5a-1, 5a-2, 5a-3, 5a-4, 5b-1, 5b-2, 5b-3 and 5b-4 is similar to that of the piezoelectric cantilevers 3a-1, 3a-2, 3a-3, 3a-4, 3b-1, 3b-2, 3b-3 and 3b-4. Thus, the mirror 1 is rocked with respect to the Y-axis.

First, an optical deflection or horizontal scanning operation by rocking the mirror 1 with respect to the X-axis is explained in detail with reference to FIGS. 5A, 5B, 5C and 5D.

As illustrated in FIGS. 5A and 5B, the drive voltage $V_{X1}$ based upon the drive data X1 stored in advance in the nonvolatile memory 221 and the drive voltage $V_{X2}$ based upon the drive data X2 stored in advance in the nonvolatile memory 222 are saw-tooth-shaped at a predetermined frequency $f_X$ such as 30 kHz and symmetrical or opposite in phase to each other with the reference voltage $V_R$ such as 0V. As a result, the piezoelectric cantilevers 3a-1, 3a-3, 3b-1 and 3b-3 and the piezoelectric cantilevers 3a-2, 3a-4, 3b-2 and 3b-4 carry out flexing operations in opposite directions to each other, so that the mirror 1 is rocked with respect to the X-axis.

In this case, as illustrated in FIG. 5C, the analog deflection angle signal $\theta_X$ of the high pass filter 251X included in the analog deflection angle signal $\theta_{Sa}$ has a large amplitude $A_X$. Note that the analog deflection angle signal $\theta_X$ is synchronized with an actual deflection angle signal $P_X$ having an amplitude $A_{X0}$ as illustrated in FIG. 5D detected by using a one-dimensional position sensitive detector (PSD) which detects a center of a light spot reflected from the mirror 1, so that a definite relationship between the amplitude $A_X$ of the analog deflection angle signal $\theta_X$ and the amplitude $A_{X0}$ of the actual deflection angle signal $P_X$ is realized and such a relationship is stored in the nonvolatile memory of the control circuit 21 in advance. Also, the one-dimensional PSD is removed in a usual operation mode.

The control circuit 21 rewrites the drive data X1 and X2 to change the amplitudes of the drive voltages $V_{X1}$ and $V_{X2}$ in such a way that the amplitude $A_X$ of the deflection angle signal $\theta_X$ is brought close to a predetermined value corresponding to a predetermined actual deflection angle.

Next, an optical deflection or vertical scanning operation by rocking the mirror 1 with respect to the Y-axis is explained in detail with reference to FIGS. 6A, 6B, 6C and 6D.

As illustrated in FIGS. 6A and 6B, the drive voltage $V_{Y1}$ based upon the drive data Y1 stored in advance in the nonvolatile memory 223 and the drive voltage $V_{Y2}$ based upon the drive data Y2 stored in advance in the nonvolatile memory 224 are saw-tooth-shaped at a predetermined frequency $f_Y$ such as 60 Hz and symmetrical or opposite in phase to each other with the reference voltage $V_R$ such as 0V. As a result, the piezoelectric cantilevers 5a-1, 5a-3, 5b-1 and 5b-3 and the piezoelectric cantilevers 5a-2, 5a-4, 5b-2 and 5b-4 carry out flexing operations in opposite directions to each other, so that the mirror 1 is rocked with respect to the Y-axis.

In this case, as illustrated in FIG. 6C, the analog deflection angle signal $\theta_Y$ of the low pass filter 251Y included in the analog deflection angle signal $\theta_{Sb}$ has a large amplitude $A_Y$. Note that the analog deflection angle signal $\theta_Y$ is synchronized with an actual deflection angle signal $P_Y$ having an amplitude $A_{Y0}$ as illustrated in FIG. 6D detected by using a one-dimensional position sensitive detector (PSD) which detects a center of light spot reflected from the mirror 1, so that a definite relationship between the amplitude $A_Y$ of the analog deflection angle signal $\theta_Y$ and the amplitude $A_{Y0}$ of the actual deflection angle signal $P_Y$ is realized and such a relationship is stored in the nonvolatile memory of the control circuit 21 in advance. Also, the one-dimensional PSD is removed in a usual operation mode.

The control circuit 21 rewrites the drive data Y1 and Y2 to change the amplitudes of the drive voltages $V_{Y1}$ and $V_{Y2}$ in such a way that the amplitude $A_Y$ of the deflection angle signal $\theta_Y$ is brought close to a predetermined value corresponding to a predetermined actual deflection angle.

In the above-described first embodiment, the meander-type piezoelectric actuators 3a and 3b are smaller in size than the meander-type piezoelectric actuators 5a and 5b, so that the meander-type piezoelectric actuators 3a and 3b are easily flexed at a higher frequency than the meander-type piezoelectric actuators 5a and 5b. Thus, the rocking frequency $f_X$ caused by the meander-type piezoelectric actuators 3a and 3b is larger than the rocking frequency $f_Y$ caused by the meander-type piezoelectric actuators 5a and 5b.

Figure 7:
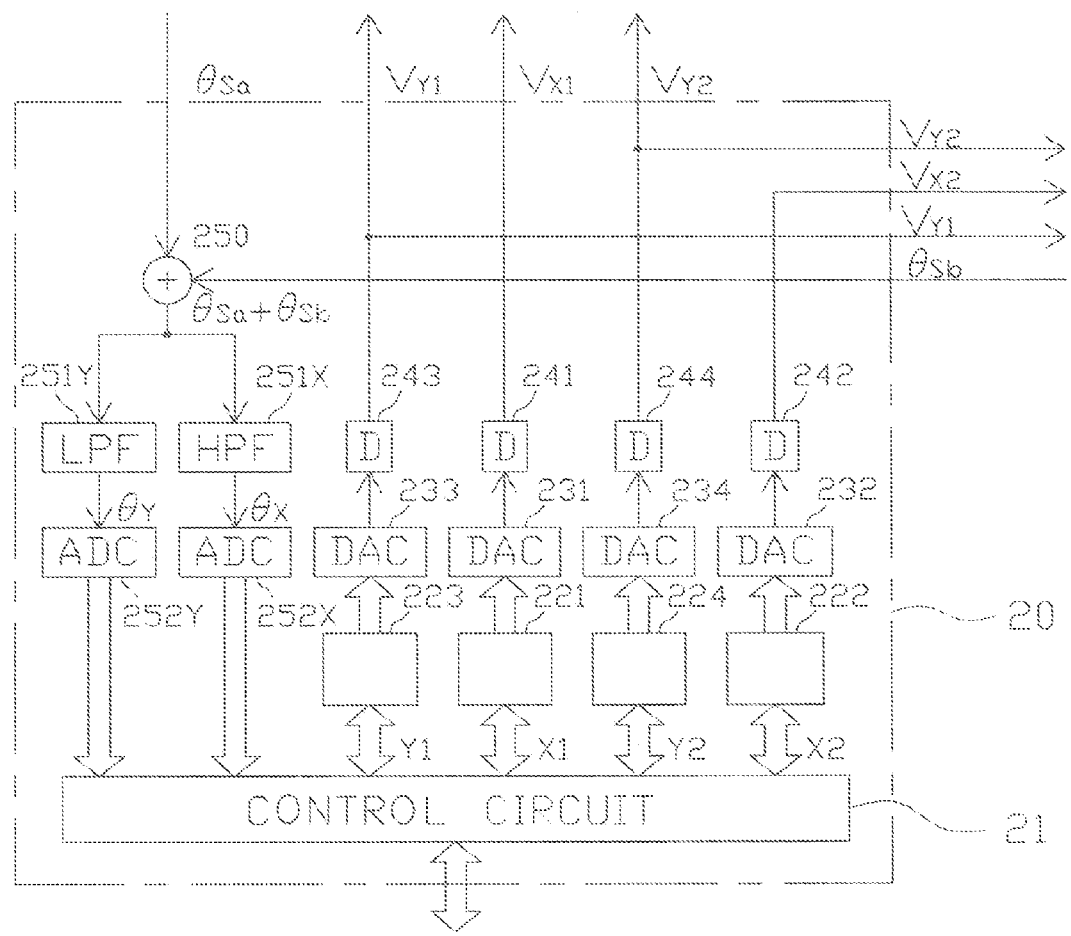
FIG. 7 is a block circuit diagram illustrating a modification of the driver of FIG. 1.
Figure 8A:
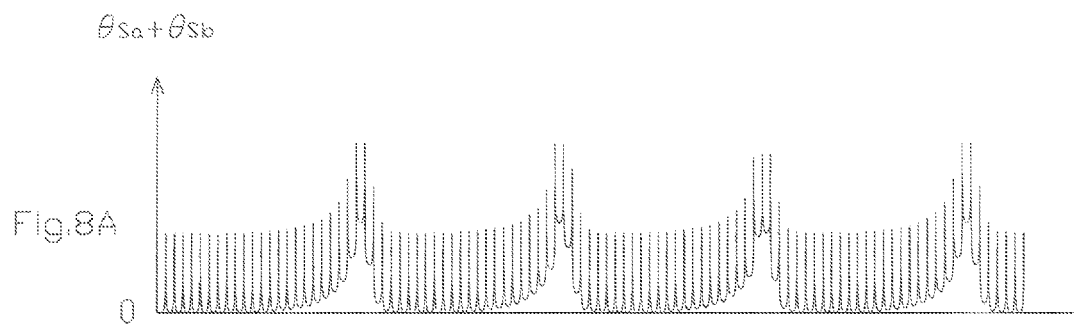
FIGS. 8A, 8B and 8C are timing diagrams for explaining the operation of the summing amplifier, the high pass filter and the low pass filter of FIG. 7.
Figure 8B:
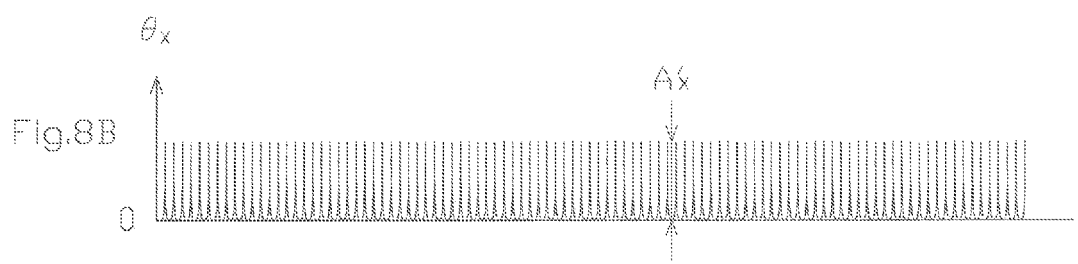
Figure 8C:
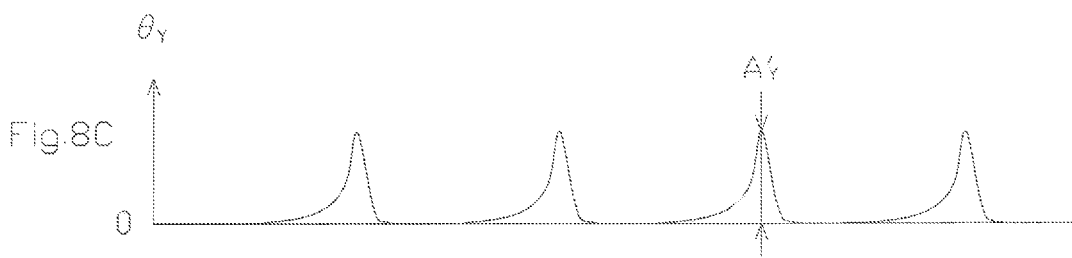

FIG. 7 is a circuit diagram illustrating a modification of the driver 20 of FIG. 1. That is, a summing amplifier 250 for amplifying the sum of the analog deflection angle signals $\theta_{Sa}$ and $\theta_{Sb}$ of the mirror 1 from the $P_{Sa}$ and $P_{Sb}$ is connected to the inputs of the high pass filter 251X and the low pass filter 251Y. As stated above, the analog deflection angle signal $\theta_{Sa}$ includes a large amount of the frequency component $f_X$ and a small amount of the frequency component $f_Y$, while the analog deflection angle signal $\theta_{Sb}$ includes a large amount of the frequency component $f_Y$ and a small amount of the frequency component $f_X$. Therefore, when the drive voltages $V_{X1}$ and $V_{X2}$ as illustrated in FIGS. 5A and 5B and the drive voltages $V_{Y1}$ and $V_{Y2}$ as illustrated in FIGS. 6A and 6B are simultaneously applied to the pads $P_{X1a}$, $P_{X2b}$, $P_{Y1a}$, $P_{Y1b}$, $P_{Y2a}$ and $P_{Y2b}$, respectively, the output $(\theta_{Sa}+\theta_{Sb})$ of the summing amplifier 250 includes a large amount of the frequency component $f_X$ and a large amount of the frequency component $f_Y$ as illustrated in FIG. 8A. Therefore, in this case, the high pass filter 251X can generate an analog deflection angle signal $\theta_X$ whose amplitude $A_X'$ is larger as illustrated in FIG. 8B, and the low pass filter 251Y can generate an analog deflection angle signal $\theta_Y'$ whose amplitude $A_Y'$ is larger as illustrated in FIG. 8C.

Note that, if the upper electrode layers of the piezoelectric sensors 6a, 6b, 7a and 7b are connected to each other on the optical deflector 10 of FIG. 1, one of the pads $P_{Ra}$ and $P_{Rb}$ can be omitted and the combined analog deflection angle signal can be supplied directly to the high pass filter 251X and the low pass filter 251Y without the summing amplifier 250.

Figure 9:
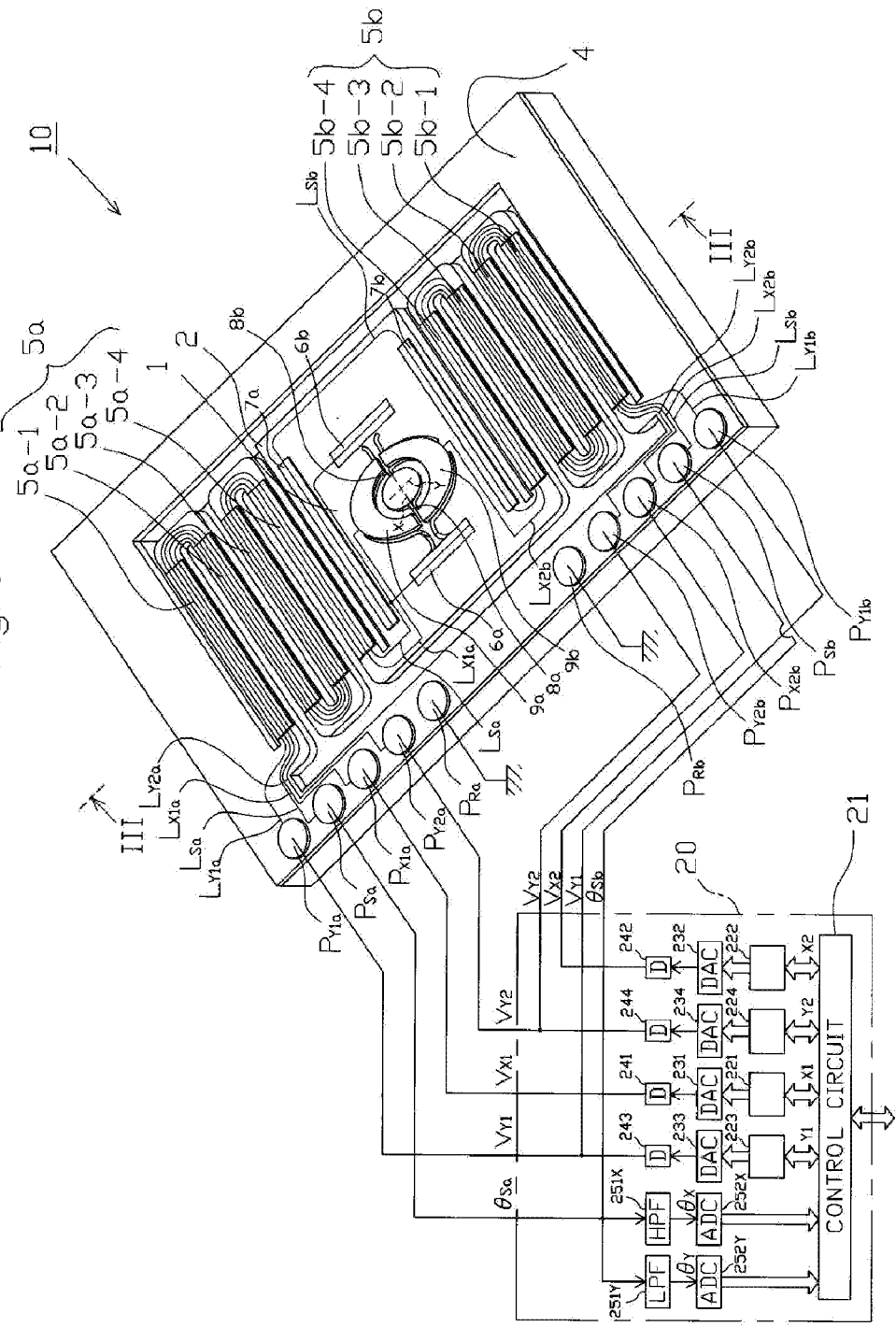
FIG. 9 is a view illustrating a second embodiment of the two-dimensional optical deflector according to the presently disclosed subject matter.

FIG. 9 illustrates a second embodiment of the two-dimensional optical deflector according to the presently disclosed subject matter, the cross-sectional views of the optical deflector 10 of FIG. 9 are similar to those of the two-dimensional optical deflector 10 of FIG. 1, and therefore, they are omitted.

In the optical deflector 10 of FIG. 9, the pair of the meander-type inner piezoelectric actuators 3a and 3b of FIG. 1 are replaced by a pair of torsion bars 8a and 8b and a pair of inner piezoelectric actuators 9a and 9b.

The meander-type inner piezoelectric actuators 3a and 3b of FIG. 1 are of a non-resonance type, but the inner piezoelectric actuators 9a and 9b associated with the torsion bars 8a and 8b of FIG. 9 are of a resonance type. That is, when the rocking frequency $f_X$ of the torsion-bar type inner piezoelectric actuators 9a and 9b is close to the natural frequency of a mechanically-vibrating system of the mirror 1 with respect to the X-axis depending upon the structure of the inner piezoelectric actuators 9a and 9b, the deflection angle of the mirror 1 with respect to the X-axis can be increased.

Also, the mirror 1 is circular, and the inner piezoelectric actuators 9a and 9b are ring-shaped to surround the mirror 1 with a slit.

The torsion bars 8a and 8b are arranged along the X-axis, and have ends coupled to the inner circumference of the movable frame 2 and other ends coupled to the outer circumference of the mirror 1. Therefore, the torsion bars 8a and 8b are twisted by the inner piezoelectric actuators 9a and 9b to rock the mirror 1 with respect to the X-axis.

The inner piezoelectric actuators 9a and 9b oppose each other along the Y-axis and sandwich the torsion bars 8a and 8b. The inner piezoelectric actuators 9a and 9b have ends coupled to the inner circumference of the movable frame 2 and other ends coupled to the torsion bars 8a and 8b. In this case, the flexing direction of the inner piezoelectric actuator 9a is opposite to that of the inner piezoelectric actuator 9b.

The pad $P_{Ra}$ is connected via via-structures (not shown) to the lower electrode layers of the inner piezoelectric actuator 9a.

The pad $P_{X1a}$ is connected via the wiring line $L_{X1a}$ to the upper electrode layers of the inner piezoelectric actuator 9a.

The pad $P_{Rb}$ is connected via via-structures (not shown) to the lower electrode layers of the inner piezoelectric actuator 9b.

The pad $P_{X1b}$ is connected via the wiring line $L_{X1b}$ to the upper electrode layers of the inner piezoelectric actuator 9b.

Next, an optical deflection or horizontal scanning operation by rocking the mirror 1 with respect to the X-axis is explained with reference to FIGS. 10A, 10B, 10C and 10D.

As illustrated in FIGS. 10A and 10B, the drive voltage $V_{X1}$ based upon the drive data X1 stored in advance in the nonvolatile memory 221 and the drive voltage $V_{X2}$ based upon the drive data X2 stored in advance in the nonvolatile memory 222 are sinusoidal at a predetermined frequency such as 30 kHz and symmetrical or opposite in phase to each other. As a result, the inner piezoelectric actuators 9a and 9b carry out flexing operations in opposite directions to each other, so that the torsion bars 8a and 8b are twisted to rock the mirror 1 with respect to the X-axis.

In this case, as illustrated in FIG. 10C, the analog deflection angle signal $\theta_X$ of the high pass filter 251X included in the analog deflection angle signal $\theta_{Sa}$ has a large amplitude $A_X$. Note that the analog deflection angle signal $\theta_X$ is synchronized with an actual deflection angle signal $P_X$ having an amplitude $A_{X0}$ as illustrated in FIG. 10D detected by using a one-dimensional position sensitive detector (PSD) which detects a center of a light spot reflected from the mirror 1, so that a definite relationship between the amplitude $A_X$ of the analog deflection angle signal $\theta_X$ and the amplitude $A_{X0}$ of the actual deflection angle signal $P_X$ is realized and such a relationship is stored in the nonvolatile memory of the control circuit 21 in advance. Also, the one-dimensional PSD is removed in a usual operation mode.

The control circuit 21 rewrites the drive data X1 and X2 to change the amplitudes of the drive voltages $V_{X1}$ and $V_{X2}$ in such a way that the amplitude $A_X$ of the deflection angle signal $\theta_X$ is brought close to a predetermined value corresponding to a predetermined actual deflection angle.

Note that an optical deflection or vertical scanning operation by rocking the mirror 1 with respect to the Y-axis is the same as that explained with reference to FIGS. 6A, 6B, 6C and 6D.

Figure 11A:
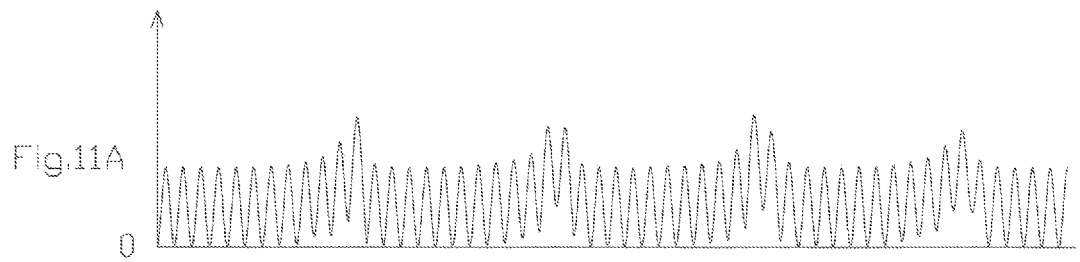
FIGS. 11A, 11B and 11C are timing diagrams for explaining a modification of the operation of the driver of FIG. 9.
Figure 11B:
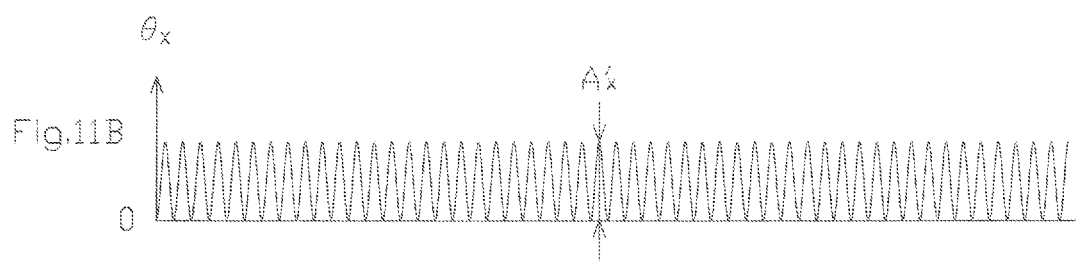
Figure 11C:
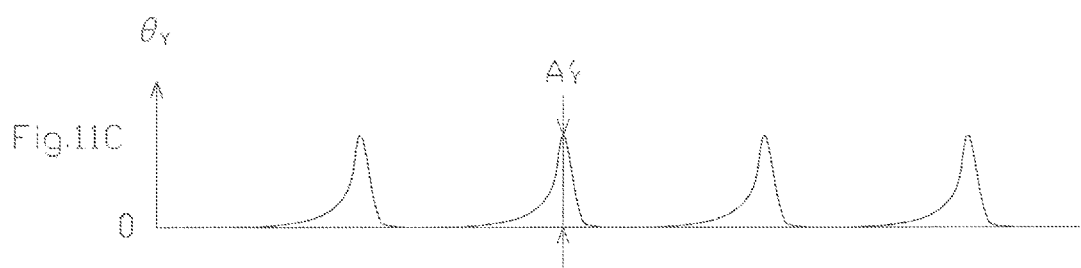

Next, consider that the driver 20 of FIG. 7 is used as the driver 20 of FIG. 9. In this case, when the drive voltages $V_{X1}$ and $V_{X2}$ as illustrated in FIGS. 10A and 10B and the drive voltages $V_{Y1}$ and $V_{Y2}$ as illustrated in FIGS. 6A and 6B are simultaneously applied to the pads $P_{X1a}$, $P_{X2b}$, $P_{Y1a}$, $P_{Y1b}$, $P_{Y2a}$ and $P_{Y2b}$, respectively, the output ($\theta_{Sa}+\theta_{Sb}$) of the summing amplifier 250 includes a large amount of the frequency component $f_X$ and a large amount of the frequency component $f_Y$ as illustrated in FIG. 11A. Therefore, in this case, the high pass filter 251X can generate an analog deflection angle signal $\theta_X'$ whose amplitude $A_X'$ is larger as illustrated in FIG. 11B, and the low pass filter 251Y can generate an analog deflection angle signal $\theta_Y'$ whose amplitude $A_Y'$ is larger as illustrated in FIG. 11C.

Note that, if the upper electrode layers of the piezoelectric sensors 6a, 6b, 7a and 7b are connected to each other on the optical deflector 10 of FIG. 9, one of the pads $P_{Ra}$ and $P_{Rb}$ can be omitted and the combined analog deflection angle signal can be supplied directly to the high pass filter 251X and the low pass filter 251Y without the summing amplifier 250.

In the above-described embodiments, AC drive voltages such as saw-tooth-shaped drive voltages are applied to the piezoelectric actuators 3a, 3b, 5a and 5b; however, DC drive voltage can be applied to the piezoelectric actuators 3a, 3b, 5a and 5b. In this case, the flexing amounts of the piezoelectric actuators 3a, 3b, 5a and 5b are linearly changed in accordance with the DC voltages.

Also, in the above-described embodiments, the piezoelectric sensors are provided on the movable frame 2 in the vicinity of the inner and outer piezoelectric actuators. However, the piezoelectric sensors can be provided on other portions of the movable frame 2, for example, edge portions of the movable frame 2, although the sensed rocking vibrations are weakened.

Further, in the above-described embodiments, two piezoelectric sensors 6a and 6b and two piezoelectric sensors 7a and 7b are provided; however, only one piezoelectric sensor, or three or more piezoelectric sensors can be provided on the movable frame 2.

Further, the presently disclosed subject matter can also be applied to a two-dimensional optical deflector having torsion-bar type outer piezoelectric actuators associated with torsion bars.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. A two-dimensional optical deflector comprising:
   a mirror;
   a movable frame supporting said mirror;
   a first piezoelectric actuator connected between said movable frame and said mirror and adapted to rock said mirror with respect to a first axis of said mirror;
   a support body supporting said movable frame;
   a second piezoelectric actuator connected between said support body and said movable frame and adapted to rock said mirror through said movable frame with respect to a second axis of said mirror; and
   at least one piezoelectric sensor provided on said movable frame and adapted to sense rocking vibrations of said mirror caused by said first and second piezoelectric actuators,
   wherein said first piezoelectric actuator comprises a pair of first meander-type piezoelectric actuators opposite to each other with respect to said second axis,
   each of said first meander-type piezoelectric actuators comprising a plurality of piezoelectric cantilevers folded at every cantilever and connected from said movable frame to said mirror, each of said piezoelectric cantilevers being in parallel with said second axis.

2. The optical deflector as set forth in claim 1, wherein said piezoelectric sensor is provided in the vicinity of one of said first and second piezoelectric actuators.

3. The optical deflector as set forth in claim 1, wherein said second axis is perpendicular to said first axis.

4. The optical deflector as set forth in claim 1, wherein said second piezoelectric actuator comprises a pair of second meander-type piezoelectric actuators opposite to each other with respect to said first axis,
   each of said second meander-type piezoelectric actuators comprising a plurality of piezoelectric cantilevers folded at every cantilever and connected from said support body to said movable frame, each of said piezoelectric cantilevers being in parallel with said first axis.

5. An optical deflector comprising:
   a mirror;
   a movable frame supporting said mirror;
   a first piezoelectric actuator connected between said movable frame and said mirror and adapted to rock said mirror with respect to a first axis of said mirror;
   a support body supporting said movable frame;
   a second piezoelectric actuator connected between said support body and said movable frame and adapted to rock said mirror through said movable frame with respect to a second axis of said mirror; and
   at least one piezoelectric sensor provided on said movable frame and adapted to sense rocking vibrations of said mirror caused by said first and second piezoelectric actuators,
   wherein said second piezoelectric actuator comprises a pair of meander-type piezoelectric actuators opposite to each other with respect to said first axis,
   each of said meander-type piezoelectric actuators comprising a plurality of piezoelectric cantilevers folded at every cantilever and connected from said support body to said movable frame, each of said piezoelectric cantilevers being in parallel with said first axis.

6. The optical deflector as set forth in claim 5, wherein said piezoelectric sensor is provided in the vicinity of one of said first and second piezoelectric actuators.

7. The optical deflector as set forth in claim 5, wherein said second axis is perpendicular to said first axis.

8. The optical deflector as set forth in claim 5, further comprising torsion bars connected between said movable frame and said mirror,
   said first piezoelectric actuator being connected via said torsion bars to said mirror and being adapted to twist said torsion bars to rock said mirror.

\* \* \* \* \*